United States Patent
Oishi et al.

(10) Patent No.: US 9,878,519 B2
(45) Date of Patent: Jan. 30, 2018

(54) FENDER FOR STRADDLED VEHICLES AND STRADDLED VEHICLE

(71) Applicant: YAMAHA HATSUDOKI KABUSHIKI KAISHA, Iwata-shi, Shizuoka-ken (JP)

(72) Inventors: Takeshi Oishi, Iwata (JP); Naoki Maetani, Iwata (JP)

(73) Assignee: YAMAHA HATSUDOKI KABUSHIKI KAISHA, Iwata-shi, Shizuoka-Ken (JP)

( * ) Notice: Subject to any disclaimer, the term of this patent is extended or adjusted under 35 U.S.C. 154(b) by 0 days.

(21) Appl. No.: 15/481,317

(22) Filed: Apr. 6, 2017

(65) Prior Publication Data

US 2017/0297300 A1 Oct. 19, 2017

(30) Foreign Application Priority Data

Apr. 15, 2016 (JP) .................. 2016-081786

(51) Int. Cl.
| | |
|---|---|
| *B32B 7/02* | (2006.01) |
| *B62J 17/00* | (2006.01) |
| *B62J 15/00* | (2006.01) |
| *B32B 5/14* | (2006.01) |
| *B32B 3/28* | (2006.01) |
| *B32B 27/08* | (2006.01) |
| *B32B 27/32* | (2006.01) |

(52) U.S. Cl.
CPC .................. *B32B 7/02* (2013.01); *B32B 3/28* (2013.01); *B32B 5/145* (2013.01); *B32B 27/08* (2013.01); *B32B 27/32* (2013.01); *B62J 15/00* (2013.01); *B32B 2250/02* (2013.01); *B32B 2250/242* (2013.01); *B32B 2307/536* (2013.01); *B32B 2307/538* (2013.01); *B32B 2307/73* (2013.01); *B32B 2571/00* (2013.01); *B32B 2605/08* (2013.01)

(58) Field of Classification Search
CPC .................................. B62J 15/00; B62J 17/00
See application file for complete search history.

(56) References Cited

U.S. PATENT DOCUMENTS

| | | | | |
|---|---|---|---|---|
| D284,575 | S * | 7/1986 | Latas | D12/184 |
| 8,556,297 | B2 * | 10/2013 | Uehara | B32B 5/08 280/851 |
| 2006/0175790 | A1 * | 8/2006 | Presby | B62D 25/18 280/152.1 |
| 2010/0090503 | A1 * | 4/2010 | Uchino | B62D 25/16 296/198 |
| 2015/0284031 | A1 * | 10/2015 | Lee | B62D 25/18 180/68.5 |

FOREIGN PATENT DOCUMENTS

| | | |
|---|---|---|
| JP | S62-105890 U | 7/1987 |
| JP | H6-135362 A | 5/1994 |
| JP | 2013-180790 A | 9/2013 |

* cited by examiner

*Primary Examiner* — John Walters
*Assistant Examiner* — James Triggs
(74) *Attorney, Agent, or Firm* — Rabin & Berdo, P.C.

(57) ABSTRACT

A fender for straddled vehicles according to an embodiment of the present invention includes a base made of a crystalline resin and disposed above a wheel, and a film which is in close contact with the back side of the base facing the wheel. The hardness of the surface of the base is lower than the hardness of the interior of the base. The hardness of the film is higher than the hardness of the surface of the base.

17 Claims, 4 Drawing Sheets

FENDER FOR STRADDLED VEHICLES AND STRADDLED VEHICLE

BACKGROUND

1. Technical Field

The present invention relates to a fender for straddled vehicles, and to a straddled vehicle.

2. Description of the Related Art

An off-road type motorcycle faces a problem in that its weight may increase because of mud adhering to the vehicle body during travel, which ruins any mass reduction efforts that may have been made to the vehicle body itself. There is also a problem in that a wash to be performed after travel may not adequately remove the mud off the vehicle body in a short time, but rather require tedious washing work.

Japanese Laid-Open Patent Publication No. 6-135362 (hereinafter "Patent Document 1") discloses a construction which facilitates removal of mud that has adhered to the back side of a fender. In the construction disclosed in Patent Document 1, a flexible mudguard which is made of a mesh material (or a fiber material) is provided on a mud-struck area that exists on the back side of the fender, this mesh material being allowed to have some slack. It is expected in Patent Document 1 that the mud that adheres to the mudguard during travel will be shaken off by the vibration associated with the travel.

However, in the construction of Patent Document 1, clayey mud may pass through the meshes of the mudguard and lodge onto the back side of the fender base. Moreover, the slack of the mudguard may restrict the position at which an exhaust pipe can be attached, or restrict up-down movements of the wheel (i.e., the rear wheel).

SUMMARY

The present invention has been made in view of the above problems, and an objective thereof is to provide a fender for straddled vehicles which suppresses mud adhesion on the back side of a fender base, without restricting the exhaust pipe layout or up-down movements of a wheel.

A fender for straddled vehicles according to an embodiment of the present invention comprises: a base made of a crystalline resin and disposed above a wheel; and a film which is in close contact with a back side of the base facing the wheel, wherein, a hardness of a surface of the base is lower than a hardness of an interior of the base; and a hardness of the film is higher than the hardness of the surface of the base.

In one embodiment, a pencil hardness of the film is not less than 2B and not more than 2H.

In one embodiment, a pencil hardness of the surface of the base is not less than 4B and not more than 2B.

In one embodiment, the film is affixed to the back side of the base.

In one embodiment, the film is formed integrally with the base through insert molding.

In one embodiment, a surface roughness Ra of the film is 0.5 μm or less.

In one embodiment, the fender for straddled vehicles comprises, on a surface thereof that is closer to the wheel, a water repellent layer.

In one embodiment, the base is made of polypropylene.

In one embodiment, the film is made of polypropylene.

In one embodiment, the back side of the base has a contoured shape.

A straddled vehicle according to an embodiment of the present invention comprises: a wheel; and the fender of any of the aforementioned constructions, disposed above the wheel.

In a fender for straddled vehicles according to an embodiment of the present invention, a film having a hardness which is higher than the hardness of the surface of a base is placed in close contact with the back side of the base. Therefore, even if mud or stones strike against the back face of the fender (or a mud-struck area constituted by the back side of the base and the film), dents are unlikely to form in the mud-struck area. This reduces the anchor effect, and thus suppresses adhesion of mud onto the mud-struck area, and makes it easier for any mud that has adhered to drop off. Since the film is in close contact with the back side of the base, the layout of the exhaust pipe and the up-down movements of the wheel will not be restricted.

From the standpoint of better preventing formation of dents on the mud-struck area, it is preferable that the pencil hardness of the film is 2B or more. From the standpoint of fabrication ease of the fender, it is preferable that the pencil hardness of the film is 2H or less.

When the hardness of the surface of the base is relatively low, or specifically, when the pencil hardness of the surface of the base is 2B or less, the present invention will have a large significance. However, if the hardness of the surface of the base is too low, the entire fender will be soft, possibly making it difficult to achieve the rigidity that is required of the fender while maintaining light weight. In this regard, it is preferable that the pencil hardness of the surface of the base is 4B or more. When the pencil hardness of the surface of the base is not less than 4B and not more than 2B, there are no particular constraints as to die cooling, and thus the producibility of the fender can be maintained sufficiently high.

Adopting a construction where the film is affixed to the back side of the base will allow the film and the base to be separately produced, thus promoting freedom of production location.

Adopting a construction where the film is formed integrally with the base through insert molding will allow omission of the task of affixing the film onto the base.

When the surface roughness (arithmetic average roughness) Ra of the film is 0.5 μm or less, the surface of the film has a sufficiently high smoothness, which will make it easy for any mud that has adhered to the back face of the fender to slip off.

When the fender includes a water repellent layer, mud adhesion can be further suppressed.

The base is preferably made of polypropylene, because polypropylene is relatively inexpensive and offers good producibility. Moreover, polypropylene has good mechanical strength, and thus good durability. Therefore, by forming the base from polypropylene, a fender which suppresses mud adhesion without restricting the exhaust pipe layout or up-down movements of a wheel, and which has good durability, can be obtained.

The film is preferably made of polypropylene, because polypropylene is relatively inexpensive and offers good producibility. Moreover, polypropylene has good mechanical strength, and thus good durability.

The present invention will have a particularly large significance when the back side of the base has some protrusions and depressions (i.e., it has a contoured shape). When any protrusions and depressions are present, the surface area is increased relative to the case where there are no protrusions and depressions, thus making it more likely for mud to accumulate. However, by placing a film having a hardness which is higher than the hardness of the surface of the base in close contact with the back side of the base, as in an embodiment of the present invention, mud is restrained from accumulating even if the back side of the base includes protrusions and depressions.

According to an embodiment of the present invention, there is provided a fender for straddled vehicles which suppresses mud adhesion on the back side of a fender base, without restricting the exhaust pipe layout or up-down movements of a wheel.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIGS. 4A and 4B respectively show cross sections taken along line 4A-4A' and line 4B-4B' in FIG. 3.

DETAILED DESCRIPTION

The inventors have conducted vigorous studies on the mechanism of mud adhesion, thereby arriving at the following findings. The claimed invention has been made based on the following findings.

Generally speaking, fenders for straddled vehicles are produced through injection molding of resin materials. When producing a fender, in order to quickly cure the melt resin which is injected into a die to attain improved producibility, the die is being cooled. This allows the melt resin which has been injected into the die to become gradually cooled, beginning from its portion that is contact with the surface of the die. Therefore, the cooling rate is faster on the surface of the melt resin than in its interior. As a result, in the completed fender, crystallinity is lower on its surface than in its interior, so that the fender surface is somewhat inferior in hardness to the fender interior.

When mud or stones strike against the back face (or rather, a "mud-struck area") of a fender as such, minute dents may form on the back face of the fender. This causes an anchor effect which makes it likely for mud to accumulate (i.e., adhere) in the dents. By preventing this anchor effect, mud adhesion may presumably be suppressed.

Hereinafter, with reference to the drawings, an embodiment of the present invention will be described. Note that the present invention is not to be limited to the following embodiment.

Figure 1:
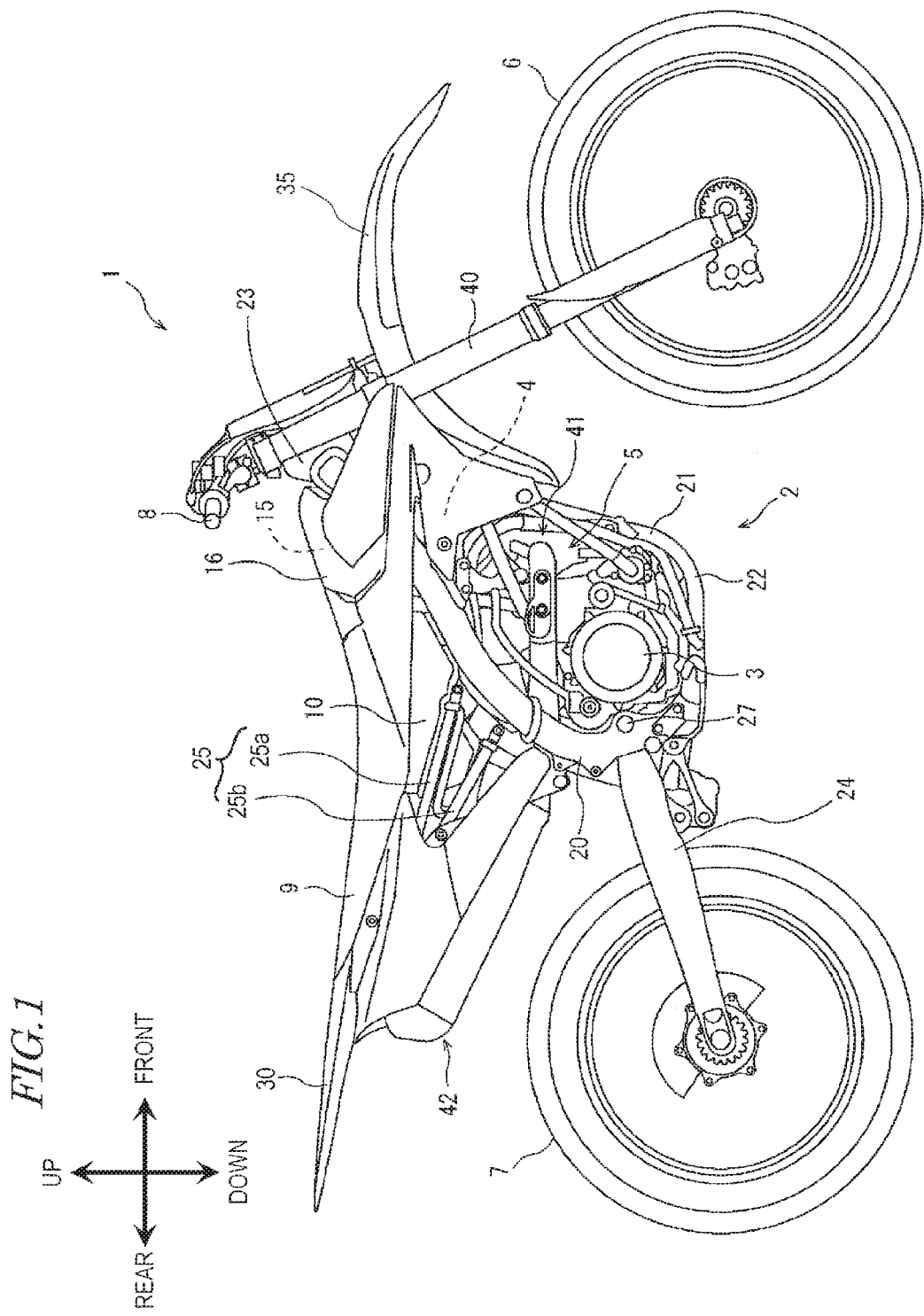
FIG. 1 is a right side view schematically showing a motorcycle (straddled vehicle) 1 according to an embodiment of the present invention.

FIG. 1 shows a straddled vehicle 1 according to the present embodiment. FIG. 1 is a right side view schematically showing the straddled vehicle 1. As shown in FIG. 1, the straddled vehicle 1 is an off-road type motorcycle (a so-called "motocrosser").

Note that a straddled vehicle according to an embodiment of the present invention is not limited to the off-road type motorcycle 1 illustrated herein. A straddled vehicle according to an embodiment of the present invention may be any other type of motorcycle, e.g., a so-called on-road type, moped type, or scooter type. A straddled vehicle according to an embodiment of the present invention is meant to be any arbitrary vehicle which a rider sits astraddle, without being limited to two-wheeled vehicles. A straddled vehicle according to an embodiment of the present invention may be a three-wheeled vehicle (LMW) or the like of a type whose direction of travel is changed as the vehicle body is tilted, or any other straddled vehicle such as an ATV (All Terrain Vehicle). In the following description and the drawings, the front, rear, right, left, up, and down are respectively meant as the front, rear, right, left, up, and down as perceived by the rider of the motorcycle 1.

As shown in FIG. 1, the motorcycle 1 includes a body frame 2, an engine 3, an air intake system 4, an exhaust system 5, a front wheel 6, a rear wheel 7, handle bars 8, a rider's seat 9, and a fuel tank 10.

The body frame 2 is a frame of a cradle type supporting the engine 3. The body frame 2 includes a main frame 20, a down frame 21, a bottom frame 22, a head pipe 23, a rear frame 25, and a pair of rear arms 24.

The head pipe 23 is provided at a front portion of the motorcycle 1.

The main frame 20 extends obliquely below, rearward from the head pipe 23. A pivot axis 27 is provided in a lower end portion of the main frame 20.

The down frame 21 is connected to the head pipe 23, at a position lower than the main frame 20. The down frame 21 extends below and rearward from the head pipe 23.

The bottom frame 22 connects the lower end of the down frame 21 with the lower end of the main frame 20.

The head pipe 23, main frame 20, down frame 21, and bottom frame 22 having the above construction are connected in loop fashion, as viewed laterally with respect to the vehicle.

The pair of rear arms 24 are placed on the right side and on the left side of the vehicle (although only one of which is shown in FIG. 1). Each of the pair of rear arms 24 has its front end portion attached to the pivot axis 27, thus being supported so as to be capable of swinging up and down around the pivot axis 27.

In a rear end portion of the pair of rear arms 24, the rear wheel 7 is attached so as to be capable of rotation, in a manner of being sandwiched along the vehicle width direction. A rear fender 30 is provided above the rear wheel 7.

At its front end, the rear frame 25 is connected to the main frame 20, while extending from the main frame 20 toward the vehicle rear. The rear frame 25 includes an upper frame 25a and a lower frame 25b. The upper frame 25a extends from the main frame 20 toward the vehicle rear, and its front end is connected to the main frame 20. At a position lower than the upper frame 25a, the lower frame 25b extends from the main frame 20 toward the vehicle rear, and its front end is connected to the main frame 20, also below the front end of the upper frame 25a. The rear portion of the upper frame 25a and the rear portion of the lower frame 25b are connected to each other.

On the upper side of a steering shaft (not shown) which is placed in the head pipe 23, the handle bars 8 are connected so as to be capable of rotation. A pair of front wheel supporting members 40 are disposed side-by-side with the steering shaft. At the lower end of the pair of front wheel supporting members 40, the front wheel 6 is attached so as to be capable of rotation. The front fender 35 is placed above the front wheel 6.

An air cleaner 15 which is covered with the cover 16 is provided rearward of the head pipe 23. A front portion of the rider's seat 9 is placed rearward of the air cleaner 15 and above the main frame 20. The rider's seat 9 extends rearward from the air cleaner 15, toward the vehicle rear. The fuel tank 10 is placed below a front portion of the rider's seat 9.

The engine 3 is placed below the main frame 20 and rearward of the down frame 21. To a front portion of the engine 3 is connected an intake pipe (not shown) of the air intake system 4 for sending the air which is taken in from the air cleaner 15 to the engine 3; and to a rear portion of the engine 3 is connected an exhaust pipe 41 of the exhaust system 5.

The exhaust system 5 allows exhaust from the engine 3 to be discharged to the outside. The exhaust system 5 includes an exhaust pipe 41 and a silencer 42 which is attached to the rear end of the exhaust pipe 41.

Figure 2:
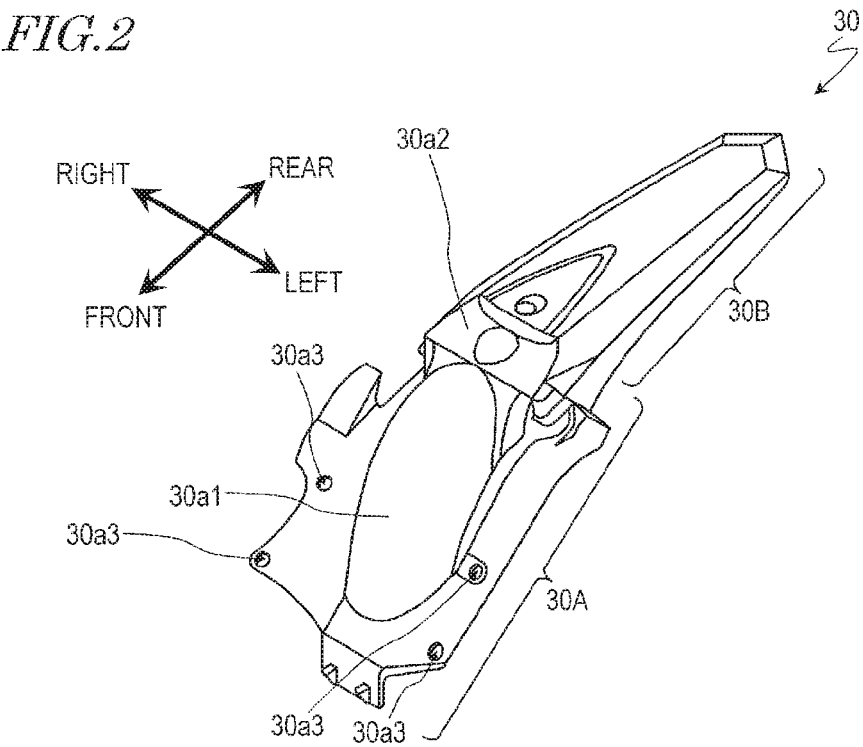
FIG. 2 is a perspective view schematically showing a rear fender 30 of the motorcycle 1.
Figure 3:
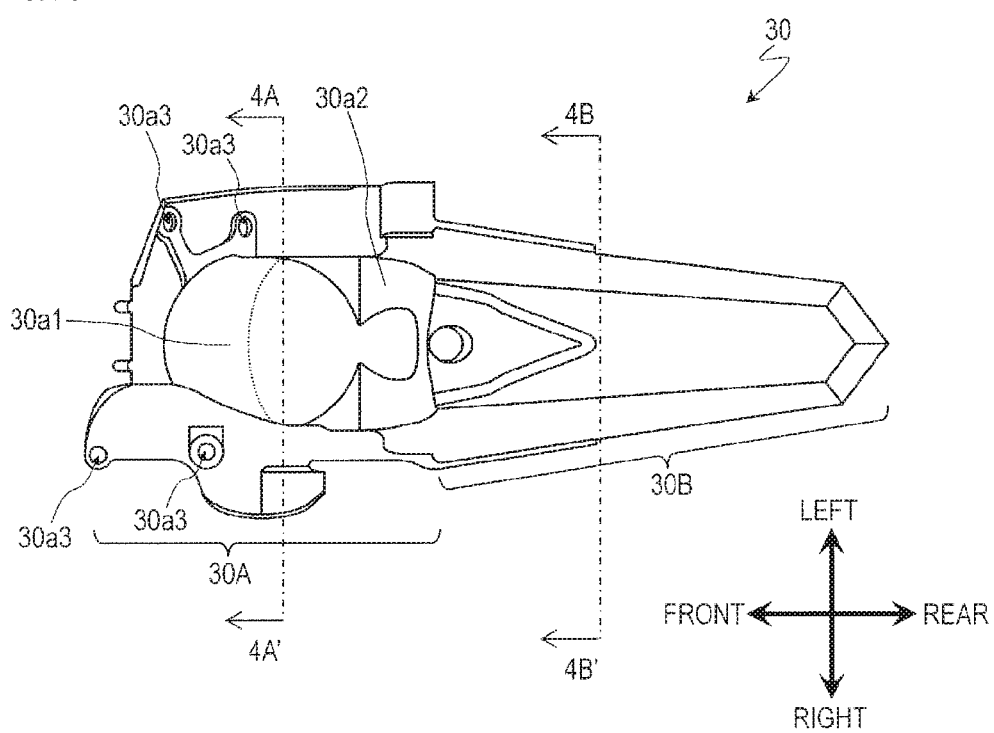
FIG. 3 is a lower plan view schematically showing the rear fender 30 of the motorcycle 1.

Hereinafter, with reference to FIG. 2 and FIG. 3, the structure of the rear fender 30 of the motorcycle 1 will be described. FIG. 2 and FIG. 3 are a perspective view and a lower plan view schematically showing the rear fender 30.

As shown in FIG. 2 and FIG. 3, the rear fender 30 is formed in the shape of a gutter that extends along the front-rear direction of the vehicle. The rear fender 30 includes: a fender forward portion 30A which is curved in a manner of following along the rear wheel 7 and is fixed to the rear frame 25 below the rider's seat 9; and a fender rearward portion 30B which extends toward a rear portion of the rider's seat 9.

The fender forward portion 30A includes: a curved portion 30a1 which presents an upward convex curve that follows along the cross-sectional shape of the rear wheel 7; and a seat receiving recess 30a2 which, continuously from the rear portion of the curved portion 30a1, is concaved in accordance with the shape of the rear portion of the rider's seat 9. In portions of the fender forward portion 30A that extend frontward and laterally from the curved portion 30a1, a plurality of bolt holes 30a3 are formed for bolts to be inserted in.

Note that the shape of the rear fender 30 is not limited to what is illustrated in FIG. 2 and FIG. 3.

Figure 4A:
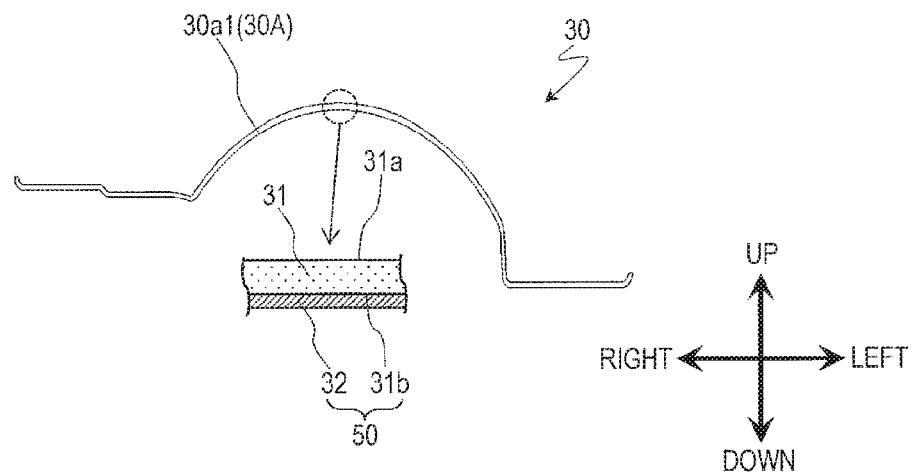
FIGS. 4A and 4B are cross-sectional views schematically showing the rear fender 30.
Figure 4B:
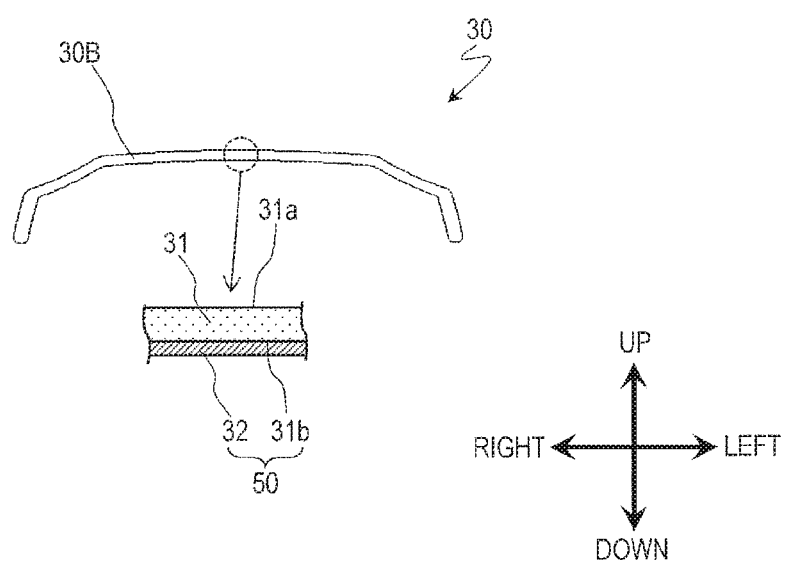

Next, with reference to FIGS. 4A and 4B, the structure of the rear fender 30 will be described more specifically. FIGS. 4A and 4B are cross-sectional views taken along line 4A-4A' and line 4B-4B' in FIG. 3, respectively. FIGS. 4A and 4B each show not only a cross section of the entire rear fender 30, but also a partially enlarged cross-sectional structure.

The rear fender 30 according to the present embodiment has a multilayer structure. Specifically, as shown in FIGS. 4A and 4B, the rear fender 30 (i.e., each of the fender forward portion 30A and the fender rearward portion 30B) includes a base 31 and a film 32 which is provided on the back side of the base 31 (i.e., so as to come in between the base 31 and the rear wheel 7).

The base 31 is placed above the rear wheel (wheel) 7. Specifically, along any radial direction of the rear wheel 7, the base 31 is located outward of the outer periphery of the rear wheel 7, while overlapping the rear wheel 7 when viewed from above the vehicle. The base 31 is made of a crystalline resin. The hardness of the surface of the base 31 is lower than the hardness of the interior of the base 31. Herein, the "surface" of the base 31 encompasses the surface of a portion 31a (which may be referred to as the "front side") of the base 31 that is located relatively upward and the surface of a portion 31b (which may be referred to as "the back side") that is located relatively downward.

The film 32 is in close contact with the back side (i.e., the portion facing the rear wheel 7) 31b the base 31. In other words, the film 32 is provided without any slack. Moreover, the film 32 has a hardness which is higher than the hardness of the surface of the base 31. The film 32 may be made of a resin, for example.

Thus, in the rear fender 30, a mud-struck area 50 that takes mud from the rear wheel 7 is constituted by the back side 31b of the base 31 and the film 32.

As described above, in the rear fender (fender for straddled vehicles) 30 according to the present embodiment, the film 32 having a hardness which is higher than the hardness of the surface of the base 31 is placed in close contact with the back side 31b of the base 31. Therefore, even if mud or stones strike against the mud-struck area 50 of the rear fender 30, dents are unlikely to form in the mud-struck area 50. This reduces the anchor effect, and thus suppresses adhesion of mud onto the mud-struck area 50, and makes it easier for any mud that has adhered to drop off. Since the film 32 is in close contact with the back side 31b of the base 31, the layout of the exhaust pipe 41 and/or the silencer 42 and the up-down movements of the rear wheel 7 will not be restricted.

When the hardness of the surface of the base 31 is relatively low, or specifically, when the pencil hardness of the surface of the base 31 is 2B or less, an embodiment of the present invention will have a large significance. If the hardness of the surface of the base 31 is too low, the entire rear fender 30 will be soft, possibly making it difficult to achieve the rigidity that is required of the rear fender 30 while maintaining light weight. In this regard, it is preferable that the pencil hardness of the surface of the base 31 is 4B or more.

From the standpoint of better preventing formation of dents on the mud-struck area 50, it is preferable that the pencil hardness of the film 32 is 2B or more. However, a film 32 with a very high hardness may be difficult to produce or acquire; thus, from the standpoint of fabrication ease of the rear fender 30, it may be preferable that the pencil hardness of the film 32 is 2H or less.

The base 31 being made of a crystalline resin is typically formed by using a die. When the pencil hardness of the surface of the base 31 is not less than 4B and not more than 2B, there are no particular constraints as to die cooling, and thus the producibility of the rear fender 30 can be maintained sufficiently high.

It suffices if the hardness of the film 32 is higher than the hardness of the surface of the base 31 in relative terms. For example, if the pencil hardness of the surface of the base 31 is 4B, then the pencil hardness of the film 32 may at least be higher than 4B (e.g., 2B). Note that the hardness of the interior of the base 31 will be higher than the hardness of the surface of the base 31. For example, if the pencil hardness of the surface of the base 31 is 4B, then the pencil hardness of the interior of the base 31 will be higher than 4B.

The film 32 may be affixed to the back side 31b of the base 31, or formed integrally with the base 31 through insert molding.

Adopting a construction where the film 32 is affixed to the back side 31b of the base 31 will allow the film 32 and the base 31 to be separately produced, thus promoting freedom of production location. An adhesive or a binder may be used in affixing the film 32 onto the base 31, for example. Alternatively, the film 32 may be affixed onto the base 31 by welding.

Adopting a construction where the film 32 is formed integrally with the base 31 through insert molding will allow omission of the task of affixing the film 32 onto the base 31. A specific method for forming the film 32 integrally with the base 31 through insert molding will be described later in detail.

When the surface roughness (arithmetic average roughness) Ra of the film 32 is 0.5 μm or less, the surface of the film 32 has a sufficiently high smoothness, which will make it easy for any mud that has adhered to the mud-struck area 50 to slip off.

Figure 5:
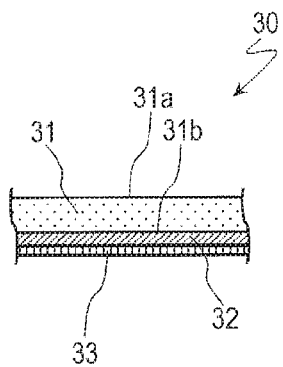
FIG. 5 is a cross-sectional view schematically showing a rear fender 30 which includes a water repellent layer 33.

As shown in FIG. 5, the rear fender 30 may include a water repellent layer 33 on its surface that is closer to the rear wheel (wheel) 7. When the rear fender 30 includes the water repellent layer 33, mud adhesion can be further suppressed.

As the water repellent layer 33, a membrane of fluoride or a membrane of silicone can be used, for example. Alternatively, a membrane having minute structures formed on its surface may be used as the water repellent layer 33, such minute structures exhibiting water repellency. Fractal structures are minute structures which are known to exhibit high water repellency. Japanese Laid-Open Patent Publication No. 2013-180790 discloses a packaging material having fractal structures formed on its surface. In the packaging material disclosed in Japanese Laid-Open Patent Publication No. 2013-180790, resin beads and water repellent particles are disposed on the outermost surface, the water repellent particles form a porous layer of three-dimensional mesh structure, thereby exhibiting high water repellency. A membrane including a structure similar to the multilayer structure that is included in the packaging material of Japanese Laid-Open Patent Publication No. 2013-180790 may be used as the water repellent layer 33. The entirety of the disclosure of Japanese Laid-Open Patent Publication No. 2013-180790 is hereby incorporated by reference.

FIG. 5 shows an example where a water repellent layer 33 that is separate from the film 32 is provided. Alternatively, the surface of the film 32 may function as the water repellent layer 33.

The base 31 is preferably made of polypropylene, because polypropylene is relatively inexpensive and offers good producibility. Moreover, polypropylene has good mechanical strength, and thus good durability. Therefore, by forming the base 31 from polypropylene, a rear fender 30 with good durability can be obtained. Note that the base 31 may be made of any crystalline resin other than polypropylene, e.g., polyamide (nylon).

As the material of the film 32, resins may be suitably used. The film 32 is preferably made of polypropylene, because polypropylene is relatively inexpensive and offers good producibility. Moreover, polypropylene has good mechanical strength, and thus good durability. Note that the film 32 may be made of any resin other than polypropylene, e.g., polyamide (nylon).

As shown in FIG. 2, FIG. 3 and FIGS. 4A and 4B, the rear fender 30 includes some protrusions and depressions, which means that the back side 31b of the base 31 also includes some protrusions and depressions (i.e., it has a contoured shape). In other words, in the present specification and claims, a contoured shape is defined as a shape having one or more protrusions and depressions such that the surface is not a flat surface. When any protrusions and depressions are present, the surface area is increased relative to the case where there are no protrusions and depressions, thus making it more likely for mud to accumulate. However, according to an embodiment of the present invention, the film 32 having a hardness which is higher than the hardness of the surface of the base 31 is placed in close contact with the back side 31b of the base 31, so that mud is unlikely to accumulate even though the back side 31b of the base 31 includes protrusions and depressions.

Note that the film 32 does not need to be provided on the entire back side 31b of the base 31. However, from the standpoint of suppressing mud adhesion, preferably as much of the back side 31b of the base 31 as possible is covered with the film 32, and it is most preferable that substantially the entire back side 31b of the base 31 is covered with the film 32.

Figure 6A:
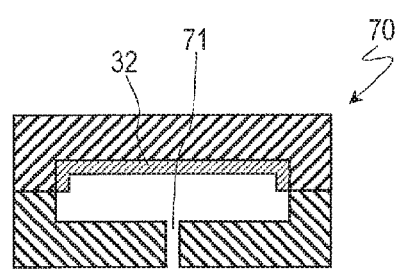
FIGS. 6A, 6B and 6C are diagrams showing steps of forming the film 32 through insert molding, integrally with a base 31.
Figure 6B:
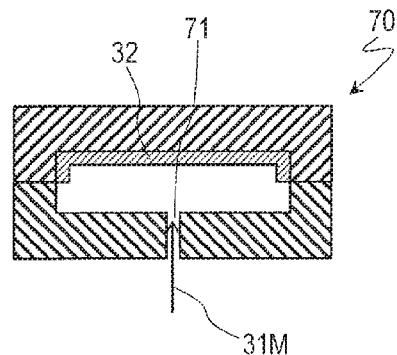
Figure 6C:
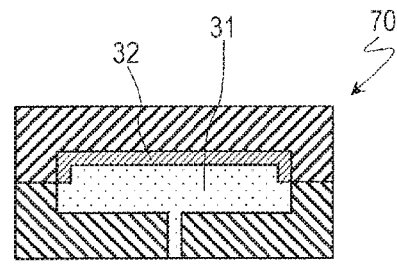

Now, with reference to FIGS. 6A, 6B and 6C, an exemplary method for forming the film 32 integrally with the base 31 through insert molding will be described.

First, a film 32 is provided. As shown in FIG. 6A, the provided film 32 is placed in a die 70. Next, as shown in FIG. 6B, a resin 31M which is the material of the base 31, is injected in a melt state into the die 70 through a gate 71. Next, the resin 31M is cooled, whereby the base 31 is formed as shown in FIG. 6C. Thereafter, after mold-opening, the rear fender 30, having a structure in which the base 31 and the film 32 are layered, is taken out. As necessary, a binder may be provided between the film 32 and the base 31.

As described above, in accordance with the rear fender 30 of the present embodiment, adhesion of mud onto the mud-struck area 50 is suppressed without restricting the layout of the exhaust pipe 41 and the up-down movements of the rear wheel 7.

Although the rear fender 30 is illustrated as an example, in addition to the rear fender 30 (or in the place of the rear fender 30), the aforementioned multilayer structure may be adopted for the front fender 35. In other words, the front fender 35 may include a base and a film which is in close contact with the back side of the base, the film having a hardness which is higher than the hardness of the surface of the base. As a result, adhesion of mud to the mud-struck area of the front fender 35 can be suppressed.

According to an embodiment of the present invention, there is provided a fender for straddled vehicles which suppresses adhesion of mud to the back side (mud-struck area) of a fender base, without restricting the exhaust pipe layout or up-down movements of a wheel.

A fender for straddled vehicles (the front fender and/or the rear fender) according to an embodiment of the present invention is suitably used for various types of straddled vehicles, e.g., motorcycles, and particularly suitably used for straddled vehicles which are expected to travel on rough terrain.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2016-081786 filed on Apr. 15, 2016, the entire contents of which are hereby incorporated by reference.

What is claimed is:

1. A fender for a straddled vehicle comprising:
a base made of a crystalline resin and configured to be disposed above a wheel of the straddled vehicle; and
a film in close contact with a back side of the base to face the wheel, wherein a hardness of a surface of the base is lower than a hardness of an interior of the base; and
a hardness of the film is higher than the hardness of the surface of the base.

2. The fender of claim 1, wherein a pencil hardness of the film is not less than 2B and not more than 2H.

3. The fender of claim 1, wherein a pencil hardness of the surface of the base is not less than 4B and not more than 2B.

4. The fender of claim 1, wherein the film is affixed to the back side of the base.

5. The fender claim 1, wherein the film is formed integrally with the base by insert molding.

6. The fender of claim 1, wherein a surface roughness Ra of the film is 0.5 µm or less.

7. The fender of claim 1, comprising a water repellant layer on a surface the base configured to face the wheel.

8. The fender of claim 1, wherein the base is made of polypropylene.

9. The fender of claim 1, wherein the film is made of polypropylene.

10. The fender of claim 1, wherein the back side of the base has a contoured shape.

11. A straddled vehicle comprising:
a wheel; and
a fender located above the wheel, the fender comprising:
a base made of a crystalline resin; and
a film in close contact with a back side of the base to face the wheel,
wherein a hardness of a surface of the base is lower than a hardness of an interior of the base; and
a hardness of the film is higher than the hardness of the surface of the base.

12. The straddled vehicle of claim 11, wherein a pencil hardness of the film is not less than 2B and not more than 2H.

13. The straddled vehicle of claim 11, wherein a pencil hardness of the surface of the base is not less than 4B and not more than 2B.

14. The straddled vehicle of claim 11, wherein the film is affixed to the back side of the base.

15. The straddled vehicle of claim 11, wherein the film is formed integrally with the base by insert molding.

16. The straddled vehicle of claim 11, wherein a surface roughness Ra of the film is 0.5 µm or less.

17. The straddled vehicle of claim 11, comprising a water repellant layer on a surface the base configured to face the wheel.

* * * * *